(12) United States Patent
Wang et al.

(10) Patent No.: US 10,129,742 B2
(45) Date of Patent: *Nov. 13, 2018

(54) METHOD FOR SYNCHRONIZING ENCRYPTION INFORMATION BETWEEN SCELL AND UE

(71) Applicant: Samsung Electronics Co., Ltd., Suwon-si, Gyeonggi-do (KR)

(72) Inventors: Hong Wang, Beijing (CN); Lixiang Xu, Beijing (CN); Huarui Liang, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/676,386

(22) Filed: Aug. 14, 2017

(65) Prior Publication Data

US 2017/0347261 A1 Nov. 30, 2017

Related U.S. Application Data

(63) Continuation of application No. 14/758,019, filed as application No. PCT/KR2013/012376 on Dec. 30, 2013, now Pat. No. 9,736,687.

(30) Foreign Application Priority Data

Dec. 28, 2012 (CN) .......................... 2012 1 0585571

(51) Int. Cl.
*H04W 12/04* (2009.01)
*H04W 76/27* (2018.01)
(Continued)

(52) U.S. Cl.
CPC ............ *H04W 12/04* (2013.01); *H04L 5/0032* (2013.01); *H04W 56/00* (2013.01); *H04W 76/27* (2018.02); *H04L 63/068* (2013.01)

(58) Field of Classification Search
CPC ... H04W 12/04; H04W 56/00; H04W 76/046; H04L 5/0032; H04L 63/068
See application file for complete search history.

(56) References Cited

U.S. PATENT DOCUMENTS 8,208,498 B2 * 6/2012 Kitazoe ................. H04W 12/04
370/235
2007/0258591 A1 11/2007 Terry et al.
(Continued)

FOREIGN PATENT DOCUMENTS

CN 101843139 A 9/2010

OTHER PUBLICATIONS

3GPP TS 36.323 V11.1.0, 3GPP; TSGRAN; Evolved Universal Terrestrial Radio Access (E-UTRA); Packet Data Convergence Protocol (PDCP) specification (Release 11), Sep. 21, 2012.
(Continued)

*Primary Examiner* — Ajit Patel
(74) *Attorney, Agent, or Firm* — Jefferson IP Law, LLP (57) ABSTRACT

The present application discloses a method for synchronizing encryption information between a SCell and UE, which includes that: the SCell transmits a COUNT value of RB established for the UE to a PCell; the PCell transmits the COUNT value received from the SCell to the UE; and the PCell receives a COUNT value of RB established on the SCell that is saved by the UE from the UE. Or, the SCell and the UE may directly exchange the COUNT value of RB. By the present application, the security and correctness of data can be ensured.

24 Claims, 4 Drawing Sheets

(51) Int. Cl.
  *H04L 5/00* (2006.01)
  *H04W 56/00* (2009.01)
  *H04L 29/06* (2006.01)

(56) References Cited

U.S. PATENT DOCUMENTS

| | | | |
|---|---|---|---|
| 2008/0096530 A1* | 4/2008 | Kuo | H04W 12/02 |
| | | | 455/411 |
| 2009/0122762 A1 | 5/2009 | Kitazoe et al. | |
| 2010/0020973 A1 | 1/2010 | Abe et al. | |
| 2010/0205442 A1* | 8/2010 | Han | H04L 9/0844 |
| | | | 713/171 |
| 2010/0329452 A1 | 12/2010 | Alanara et al. | |
| 2011/0072488 A1* | 3/2011 | Bi | H04L 63/108 |
| | | | 726/1 |
| 2011/0159873 A1 | 6/2011 | Iwamura et al. | |
| 2011/0294508 A1 | 12/2011 | Min et al. | |
| 2012/0077501 A1 | 3/2012 | Zhang et al. | |
| 2012/0099525 A1 | 4/2012 | Maheshwari | |
| 2012/0230298 A1 | 9/2012 | Kitazoe et al. | |
| 2013/0010691 A1* | 1/2013 | Jung | H04W 72/0406 |
| | | | 370/328 |
| 2013/0122918 A1* | 5/2013 | Boley | H04W 52/0212 |
| | | | 455/450 |
| 2014/0112474 A1* | 4/2014 | Escott | H04L 63/18 |
| | | | 380/270 |

OTHER PUBLICATIONS

3GPP TS 36.331 V11.1.0, 3GPP; TSGRAN; Evolved Universal Terrestrial Radio Access (E-UTRA); Radio Resource Control (RRC); Protocol specification (Release 11), Sep. 26, 2012.
3rd Generation Partnership Project; Technical Specification Group Services and System Aspects; 3GPP System Architecture Evolution (SAE); Security architecture (Release 12), 3GPP TS 33.401 v12.5.1, Oct. 24, 2012, Sophia-Antipolis, France.
Chinese Office Action dated Feb. 5, 2018, issued in Chinese Application No. 201210585571.7.

* cited by examiner

METHOD FOR SYNCHRONIZING ENCRYPTION INFORMATION BETWEEN SCELL AND UE

CROSS-REFERENCE TO RELATED APPLICATION(S)

This application is a continuation application of prior application Ser. No. 14/758,019, filed on Jun. 26, 2015, which has issued as U.S. Pat. No. 9,736,687 on Aug. 15, 2017 and claimed the benefit under § 365(c), of an International application filed on Dec. 30, 2013 and assigned application number PCT/KR2013/012376, which claimed the benefit under 35 U.S.C § 119(a) of a Chinese patent application filed on Dec. 28, 2012 in the State Intellectual Property Office and assigned Serial number 201210585571.7, the entire disclosure of which is hereby incorporated by reference

TECHNICAL FIELD

The present application relates to radio communication technologies, and more particularly to a method for synchronizing encryption information between a Secondary Cell (SCell) and User Equipment (UE).

BACKGROUND ART

Figure 1:
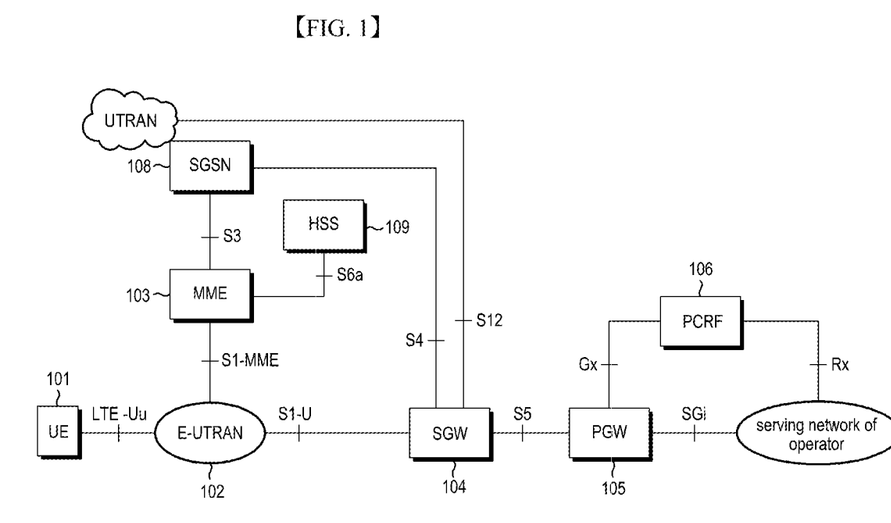
FIG. 1 is a schematic diagram illustrating the structure of a SAE.

Modern mobile communication technology tends to provide high-data-rate multimedia services for users. FIG. 1 is a schematic diagram illustrating the structure of a System Architecture Evolution (SAE).

In FIG. 1, UE 101 is a terminal device for receiving data. An Evolved Universal Terrestrial Radio Access Network (E-UTRAN) 102 is a radio access network which includes an eNodeB/NodeB for providing a radio network interface for the UE. A Mobile Management Entity (MME) 103 is configured to manage mobility contexts, session contexts and security information of the UE. A Serving Gateway (SGW) 104 is configured to provide functions of a subscriber plane. The MME 103 and the SGW 104 may be located in the same physical entity. A Packet Gateway (PGW) 105 is configured to implement charging and legal monitoring functions. The PGW 105 and the SGW 104 may be located in the same physical entity. A Policy and Charging Rules Function (PCRF) 106 is configured to provide QoS policies and charging rules. A Service GPRS Supporting Node (SGSN) 108 is a network node device for providing routing for data transmission in a Universal Mobile Telecommunications System (UMTS). A Home Subscriber Server (HSS) 109 is a home subsystem of the UE and is configured to protect user information including the current location of the UE, the address of a serving node, user security information and packet data contexts of the UE.

In current Long Term Evolution (LTE) system, each cell supports bandwidth of 20 MHz at most. In order to increase the peak rate of UE, a Carrier Aggregation (CA) technology is introduced in a LTE-Advanced system. Through the CA technology, the UE may communicate with multiple cells that are managed by the same evolved Node B (eNB) and work on different frequencies, which makes transmission bandwidth up to 100 MHz and doubles the uplink and downlink peak rate of the UE.

Figure 2:
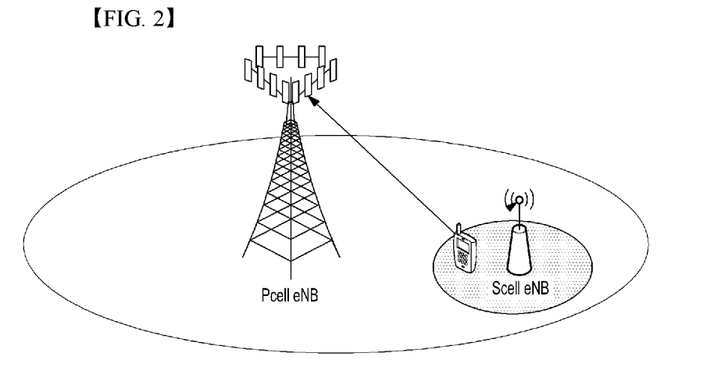
FIG. 2 is a schematic diagram illustrating cross-eNB CA.

In order to increase the transmission bandwidth, one user may be served by multiple cells, and these cells may be covered by one eNB or multiple eNBs, and thus this technology is called CA technology. FIG. 2 is a schematic diagram illustrating cross-eNB CA. For UE working in the case of CA, aggregated cells include a Primary Cell (PCell) and a SCell. There is only one PCell, and the PCell is a serving cell and is always in an active state. The PCell can be handed over only through a handover process. The UE transmits and receives Non-Access Stratum (NAS) information only in the PCell, and a Physical Uplink Control Channel (PUCCH) is transmitted only in the PCell.

In a current system, the MME needs to encrypt signalings of non-access layer and the eNB needs to encrypt Radio Resource Control (RRC) signalings and data. The MME calculates an initial key (KeNB) and transmits the KeNB to the eNB. Further, the MME transmits a set of parameters (Next Hop, called NH for short, and Next Hop Counter, called NCC for short) to the eNB through a handover message. These parameters may be used for calculating the KeNB. In an X2 handover process, a source eNB calculates a KeNB used by a destination eNB. The KeNB used by the destination eNB may be a new KeNB that is generated based on a KeNB currently used and referring to the downlink frequency and Protocol Control Information (PCI) of the destination eNB. This method is called a horizontal generating method. The KeNB used by the destination eNB may also be generated according to the NH and NCC saved by the source eNB. This method is called a vertical generating method. These methods have been defined in a current protocol 3GPP 33.401. The UE generates its KeNB by using the same algorithm as that used by the MME. When the UE performs X2 or S1 handover, the eNB transmits a message to the UE, to inform the UE of the NCC used currently by the eNB and indicate the UE to generate a new KeNB. The UE generates the new KeNB according to the horizontal or vertical generating method. The NCC is used to determine which one of the horizontal generating method and the vertical generating method is used by the UE. If the NCC is the same as the NCC corresponding to the KeNB used currently by the UE, the UE uses the horizontal generating method, and if the NCC is different from the NCC corresponding to the KeNB used currently by the UE, the UE uses the vertical generating method.

When data synchronization is performed, another input parameter besides the KeNB is a COUNT value of 32 bits. The COUNT value includes two sections, a High Frame Number (HFN) and a serial number of Packet Data Convergence Protocol (PDCP). The length of serial number of PDCP is configured by a high layer, and the length of HFN is equal to 32 minus the length of serial number of PDCP.

DISCLOSURE

Technical Problem

When the data plane of the UE is provided by the PCell and the SCell, the SCell needs to calculate the COUNT value and use it to encrypt the data plane, and the UE needs to use the same COUNT value to decrypt the data plane. And thus, a process of synchronizing the COUNT value between the SCell and the UE is needed, but current protocols do not support this process.

Technical Solution

The present application provides several methods for synchronizing a COUNT value between a SCell and UE. In the case of establishing a Radio Bearer (RB) between UE and multiple eNBs, data on these links may be encrypted and decrypted correctly.

A method for synchronizing encryption information between a SCell and UE includes: transmitting, by the SCell, a COUNT value of RB established for the UE to a PCell; transmitting, by the PCell, the COUNT value received from the SCell to the UE; and receiving, by the PCell, a COUNT value of RB that is saved by the UE from the UE.

Preferably, the COUNT value transmitted by the SCell to the PCell, the COUNT value transmitted by the PCell to the UE and the COUNT value received by the PCell from the UE are highest N bits of the COUNT value, wherein N is a predefined positive integer.

Preferably, the transmitting, by the UE, the COUNT value to the PCell includes: transmitting, by the UE, the COUNT value of RB indicated by the PCell to the PCell, or comparing, by the UE, the COUNT value of RB that is saved by the UE with the COUNT value of RB transmitted by the PCell, and when the COUNT value of RB that is saved by the UE and the COUNT value of RB transmitted by the PCell are not identical, transmitting, by the UE, the COUNT value of RB that is saved by the UE to the PCell; and/or transmitting, by the UE, the COUNT value of RB that is saved by the UE but is not contained in the transmission of the PCell to the PCell.

Preferably, the method further includes: checking, by the PCell, whether the COUNT value of RB established by the SCell for the UE reaches a predefined threshold.

Preferably, the method further includes: checking, by the PCell, whether the COUNT value of RB on the SCell and the COUNT value of RB on the UE are identical.

Preferably, if the COUNT value of RB on the SCell and the COUNT value of RB on the UE are not identical, the method further includes: releasing, by the PCell, a radio connection of the UE, and transmitting a message to the SCell to request the SCell to release information of the UE saved by the SCell.

Preferably, if the COUNT value of RB established by the SCell for the UE reaches the predefined threshold, the method further includes: transmitting, by the PCell, a message to the SCell to request to release or reconfigure the RB whose COUNT value reaches the predefined threshold or perform another operation.

Preferably, the method further includes: checking, by the SCell, whether the COUNT value of RB established by the SCell for the UE reaches a predefined threshold.

Preferably, the method further includes: transmitting, by the PCell, the COUNT value received from the UE to the SCell.

Preferably, if the COUNT value of RB on the SCell and the COUNT value of RB on the UE are not identical, the method further includes: transmitting, by the SCell, a message to the PCell to request to release a Radio Resource Control (RRC) connection of the UE.

Preferably, if the COUNT value of RB established by the SCell for the UE reaches the predefined threshold, the method further includes: transmitting, by the SCell, a message to the PCell to request to release or reconfigure the RB whose COUNT value reaches the predefined threshold or perform another operation.

Preferably, the SCell periodically transmits the COUNT value to the PCell or transmits the COUNT value to the PCell according to a configured threshold.

Preferably, the SCell transmits the COUNT value to the PCell after receiving a synchronization checking request message of COUNT value from the PCell.

Preferably, the synchronization checking request message of COUNT value contains a cell identity of the SCell, and when the synchronization checking request message of COUNT value does not contain an identity of the RB, transmitting, by the SCell, COUNT values of all RBs established by the SCell for the UE to the PCell; and when the synchronization checking request message of COUNT value does not contain the cell identity of the SCell, transmitting, by the SCell, COUNT values of all RBs established in an eNB covering the SCell for the UE to the PCell.

A method for synchronizing encryption information between a SCell and UE includes: informing, by the SCell, the UE of a COUNT value of RB; and receiving, by the SCell, a COUNT value of RB from the UE.

Preferably, the COUNT value transmitted by the SCell to the UE and the COUNT value received by the SCell from the UE are highest N bits of the COUNT value, wherein N is a predefined positive integer.

Preferably, the transmitting, by the UE, the COUNT value to the SCell includes: transmitting, by the UE, COUNT values of all RBs to the SCell, or comparing, by the UE, the COUNT value of RB that is saved by the UE with the COUNT value of RB transmitted by the SCell, and when the COUNT value of RB that is saved by the UE and the COUNT value of RB transmitted by the SCell are not identical, transmitting, by the UE, the COUNT value of RB that is saved by the UE to the SCell; and/or transmitting, by the UE, the COUNT value of RB that is saved by the UE but is not contained in the transmitting of the SCell to the SCell.

Preferably, the method further includes: initiating, by the SCell, a SCell RB reconfiguring or releasing request to a PCell, to request to reconfigure or release any RB; or, initiating, by the SCell, a RRC connection releasing request to the PCell.

As can be seen from the above solution of the present application, by the methods for synchronizing the COUNT value between the SCell and the UE, the UE may decrypt the data transmitted by the SCell, and the SCell may also correctly decrypt the data transmitted by the UE, thereby ensuring the security and correctness of data. By the methods of the present application, the data of SCell is transmitted after being encrypted, thereby ensuring the security of data.

BEST MODE

In order to make the object, technical solution and merits of the present application clearer, the present application will be illustrated in detail hereinafter with reference to the accompanying drawings.

The present application provides two methods for synchronizing encryption information between a SCell and UE.

In one method, the encryption information is transmitted between the SCell and the UE through a PCell, and in the other method, the encryption information is directly transmitted between the SCell and the UE, so as to synchronize the encryption information.

Figure 3:
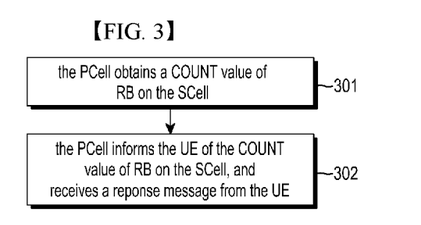
FIG. 3 is a flowchart illustrating a first method of the present application.

FIG. 3 illustrates a method for synchronizing encryption information between the SCell and the UE through the PCell, i.e., a first method for synchronizing the encryption information provided by the present application. As shown in FIG. 3, the method includes following blocks.

In block 301, the PCell obtains a COUNT value of RB on the SCell.

The PCell may obtain COUNT values of multiple RBs on the SCell. The PCell may obtain the COUNT value of RB through a periodical report of the SCell, or the SCell reports the COUNT value of RB according to a configured threshold, or the PCell actively requests the SCell to report the COUNT value of RB on the SCell.

In block 302, the PCell informs the UE of the COUNT value of RB on the SCell, and receives a response message from the UE.

And thus, the PCell has obtained the COUNT value of RB on the SCell and the COUNT value of RB on the UE. When the COUNT value of RB on the SCell and the COUNT value of RB on the UE are not synchronous, the PCell may initiate an operation. Or, the PCell may transmit a synchronization checking response message returned by the UE to the SCell. In this way, the SCell obtains the COUNT value of RB on the SCell and the COUNT value of RB on the UE, and when the COUNT value of RB on the SCell and the COUNT value of RB on the UE are not synchronous, the SCell may initiate an operation.

Detailedly, after the PCell obtains the above information, the PCell checks whether the COUNT value of RB reaches a predefined threshold; if yes, the PCell decides how to process the RB. There are multiple methods for processing the RB. For example, the PCell releases or reconfigures the RB established on the SCell, or the PCell transmits a message to the SCell to make the SCell perform an intracell handover process. The PCell also checks whether the COUNT value of RB on the SCell and the COUNT value of RB on the UE are identical; if no, the PCell releases the radio connection of the UE and the information of the UE on the SCell, or reports this case to an operation and maintenance node.

After the PCell obtains the above information, the SCell checks whether the COUNT value of RB reaches the predefined threshold. The method may further include that, the PCell transmits the response message of the UE to the SCell. According to the method, the SCell checks whether the COUNT value of RB reaches the predefined threshold; if yes, the SCell decides how to process the RB. There are multiple methods for processing the RB. For example, the SCell initiates a releasing process of the RB. The SCell also checks whether the COUNT value of RB on the SCell and the COUNT value of RB on the UE are identical; if no, the method further includes that the SCell initiates a releasing process of radio connection of the UE, and the PCell releases the radio connection of the UE and the information of the UE on the SCell, or reports this case to the operation and maintenance node.

The first method is illustrated hereinafter with reference to three examples.

Figure 4:
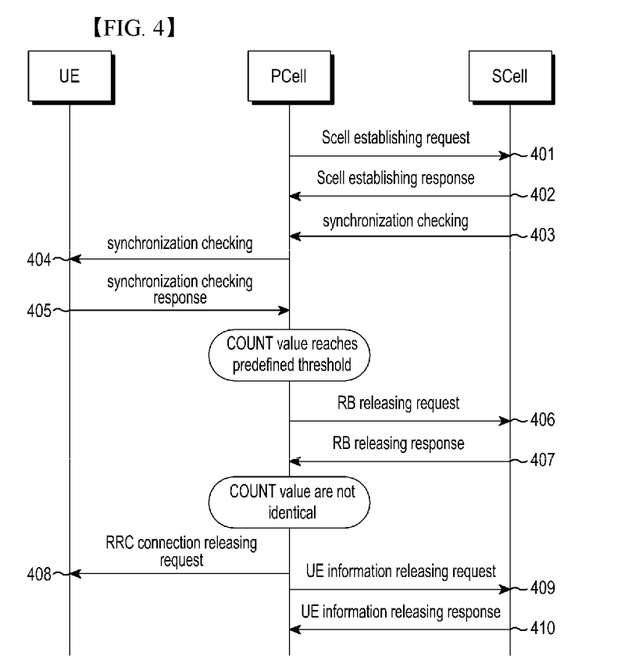
FIG. 4 is a flowchart illustrating a method according to a first example of the present application.

A first example describes a process of synchronizing the COUNT value between the SCell and the UE through the PCell. In this example, the SCell actively transmits the COUNT value to the PCell. The PCell checks whether the synchronization information of the UE and the synchronization information of the network are identical and whether the COUNT value reaches the predefined threshold. FIG. 4 is a flowchart illustrating a method according to the first example of the present application. As shown in FIG. 4, the method includes following blocks.

In block 401, the PCell transmits a SCell establishing request message to the SCell, and requests an eNB covering the SCell to establish a new RB for the UE.

The PCell decides to establish a new SCell for the UE. The PCell makes the decision based on different reasons. A first reason is because the load of the PCell is large and the SCell may transmit data of the UE, so as to share the load the PCell. A second reason is because the MME requests the PCell to establish a new RB and the PCell decides to establish the new RB in the SCell. The SCell is selected based on the channel quality of the cell detected by the UE, and the UE reports the detected channel quality to the PCell through a measurement report. The new SCell and the PCell are covered by different eNBs. Suppose the new SCell is covered by eNB 2.

The serving cell of the UE decides to establish a radio access bearer on the SCell, and eNB 1 may select the SCell according to radio signal quality.

Suppose the SCell is covered by the eNB 2, and the eNB 1 transmits a message to the eNB 2. The name of the message may be another name. The message contains an identity of destination cell, an X2 interface identity of the UE, and information of to-be-established LTE E-UTRAN Radio Access Bearer (E-RAB). The information of to-be-established LTE E-RAB contains a Bearer Id and QoS information of the E-RAB, and a transport layer address and tunnel port identity of serving gateway (or the eNB 1) receiving uplink data.

In block 402, the SCell transmits a SCell establishing response message to the PCell.

The eNB 2 confirms that the SCell is established successfully, and transmits a message to the eNB 1. The SCell establishing response message contains information of the SCell that is covered newly by the eNB 2, and a transport layer address and tunnel port identity for receiving downlink data.

The information of cell may contain a Physical Cell Identity (PCI), cell identity, Public Land Mobile Network (PLMN) identity, uplink and downlink frequency and bandwidth of the cell, and further contains the number of antenna ports, information of Multicast Broadcast Single Frequency Network (MBSFN) subframe, and the configuration of Physical Random Access Channel (PRACH). The information of cell further contains the general configuration of Physical Downlink Shared Channel (PDSCH) of the cell, such as the reference signal power of the PDSCH and P-B. The information of the serving cell further contains the configuration of Physical Hybrid ARQ Indicator Channel (PHICH), such as information indicating that the duration of the PHICH is normal or extended, and resources of the PHICH.

In block 403, the SCell transmits a synchronization checking message to the PCell.

The SCell may periodically transmit the synchronization checking message, or transmit the synchronization checking message according to a configured threshold. The synchronization checking message contains a cell identity of the SCell, a Bearer Id of the RB and an uplink COUNT value and/or downlink COUNT value of the RB. Only several highest bits of the COUNT value are contained when a COUNT state is transmitted. For example, highest 25 bits of the COUNT value are contained, or all bits of the COUNT value are contained.

In block 404, the PCell transmits the synchronization checking message to the UE.

The synchronization checking message contains the Bearer Id of the RB and the uplink COUNT value and/or downlink COUNT value of RB. Only several highest bits of the COUNT value may be contained. For example, highest 25 bits of the COUNT value are contained, or all bits of the COUNT value are contained.

In block 405, the UE transmits a synchronization checking response message to the PCell.

The UE also saves the COUNT value of RB, checks whether the saved COUNT value and the COUNT value described in block 404 are identical, and transmits a checking result through a response message.

The response message may be implemented through different methods. For example, the response message contains the Bearer Id of the RB, and the uplink COUNT value and/or downlink COUNT value of RB. The RB contained in the response message is the RB described in block 404. Only several highest bits of the COUNT value may be contained when a COUNT state is transmitted. For example, highest 25 bits of the COUNT value are contained, or all bits of the COUNT value are contained.

Or, when the COUNT value saved by the UE and the COUNT value described in block 404 are identical, the response message does not contain the information of the RB. If the COUNT value saved by the UE and the COUNT value described in block 404 are not identical, the response message contains the information of the RB. Cases that the COUNT value saved by the UE and the COUNT value described in block 404 are not identical include that:

(1) the RB has been established, but the RB is not contained in the synchronization checking message in block 404;

(2) the RB has been established and the RB is contained in the synchronization checking message in block 404, but the uplink and/or downlink COUNT value of the RB saved by the UE is not identical to the COUNT value indicated by the synchronization checking message in block 404;

(3) other instances.

In this example, the PCell checks whether the synchronization information of the UE and the synchronization information of the network are identical and whether the COUNT value reaches the predefined threshold. If the COUNT value of a certain RB reaches the predefined threshold, following blocks is performed.

In block 406, the PCell transmits a RB releasing request message, or another process is performed, for example, the PCell transmits a SCell reconfiguring request message, or a message for making the SCell perform intracell handover.

In block 407, the SCell transmits a response message to the PCell.

If the PCell detects that the COUNT value on the UE is not identical to the COUNT value saved by the SCell, following blocks are performed.

In block 408, the PCell initiates a RRC connection releasing process. The PCell transmits a RRC connection releasing request message to the UE to initiate the RRC connection releasing process. Afterwards, the UE transmits a response message to confirm that the RRC connection releasing process is completed. This process is the same as a current defined process and is omitted herein.

In block 409, the PCell releases the information of the UE saved on the SCell. The PCell transmits a UE information releasing request message to the SCell. The UE information releasing request message contains an identity of the UE, and may further contain a releasing reason. The identity of the UE may be an X2 interface identity of the UE, or a unique identity of the UE, or any identity that can uniquely identify the UE in the SCell.

In block 410, the SCell transmits a response message to confirm that the information of the UE is released.

And thus, the process described in the first example ends.

Figure 5:
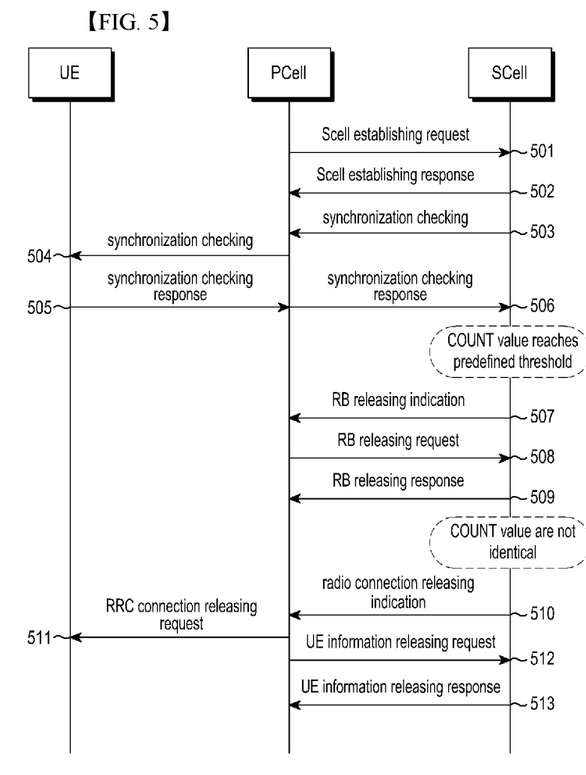
FIG. 5 is a flowchart illustrating a method according to a second example of the present application.

A second example describes a process of synchronizing the COUNT value between the SCell and the UE through the PCell. In this example, the SCell actively transmits the COUNT value to the PCell. The SCell checks whether the synchronization information of the UE and the synchronization information of the network are identical and whether the COUNT value reaches the predefined threshold. FIG. 5 is a flowchart illustrating a method according to a second example of the present application. As shown in FIG. 5, the method includes following blocks.

Blocks 501 to 505 are the same as blocks 401 to 405 respectively and are omitted herein.

In this example, the SCell checks whether the synchronization information of the UE and the synchronization information of the network are identical and whether the COUNT value reaches the predefined threshold. If the COUNT value reaches the predefined value, in block 506, the PCell transmits a synchronization checking response message to the SCell. The synchronization checking response message contains the information described in block 405.

In block 507, the SCell may check whether the COUNT value reaches the predefined threshold; if yes, the SCell determines that the COUNT value is close to an overflow state, and transmits a RB releasing indication message. The name of the RB releasing indication message may be another name, and the RB releasing indication message contains a Bearer Id, and may further contain a releasing reason.

In block 508, the PCell transmits a RB releasing request message, or another process is performed, for example, the PCell transmits a SCell reconfiguring request message, or a message for making the SCell perform intracell handover.

In block 509, the SCell transmits a response message to the PCell.

If the COUNT value on the UE and the COUNT value on the SCell are not identical, in block 510, the SCell transmits a radio connection releasing indication message to the PCell. The name of the radio connection releasing indication message may be another name. The radio connection releasing indication message contains the identity of the UE, and may further contain a releasing reason. The identity of the UE may be an X2 interface identity of the UE, or a unique identity of the UE, or any identity that can uniquely identify the UE in the SCell.

Blocks 511 to 513 are the same as blocks 408 to 410 respectively and are omitted herein.

And thus, the process described in the second example ends.

Figure 6:
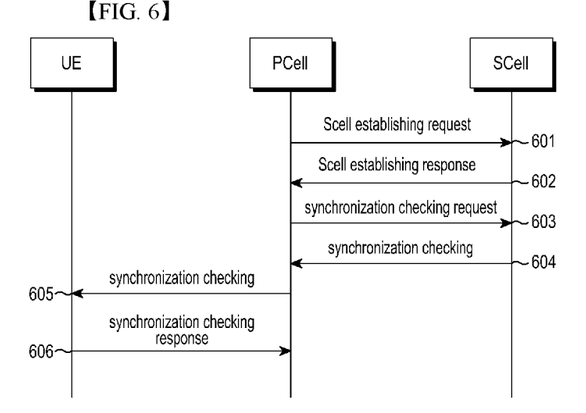
FIG. 6 is a flowchart illustrating a method according to a third example of the present application.

A third example describes a process of synchronizing the COUNT value between the SCell and the UE through the PCell. In this example, the SCell transmits the COUNT value to the PCell after being initiated by the PCell. In the third example, blocks following block 604 may be implemented through two methods which respectively correspond the blocks following block 403 in the first example and the blocks following block 503 in the second example. That is, the PCell or the SCell checks whether the synchronization information of the UE and the synchronization information of the network are identical and whether the COUNT value reaches the predefined threshold. The third example only describes some blocks different from the first example and the second example. FIG. 6 is a flowchart illustrating a method for synchronizing the COUNT value according to the third example. As shown in FIG. 6, the method includes following blocks.

Blocks 601 and 602 are the same as blocks 401 and 402 respectively and are omitted herein.

In block 603, the PCell transmits a synchronization checking request message to the SCell.

The synchronization checking request message contains the X2 interface identity of the UE, may further contain the cell identity of the SCell, and may further contain the Bearer Id. If the synchronization checking request message does not contain the Bearer Id, the SCell needs to report COUNT states of all RBs established on the SCell to the PCell. If the synchronization checking request message does not the cell identity of the SCell, the SCell needs to report the COUNT states of all RBs established on an eNB covering the SCell to the PCell.

In block 604, the SCell transmits a synchronization checking message to the PCell.

The synchronization checking message contains the Bearer Id of the RB and an uplink COUNT value and/or downlink COUNT value of RB. Only several highest bits of the COUNT value are contained when a COUNT state is transmitted. For example, highest 25 bits of the COUNT value are contained, or all bits of the COUNT value are contained.

Blocks 605 and 605 are the same as blocks 404 and 405 respectively and are omitted herein.

Afterwards, if the PCell checks whether the synchronization information of the UE and the synchronization information of the network are identical and whether the COUNT value reaches the predefined value, blocks following block 606 are the same as blocks 406, 407, 408, 409 and 410 respectively and are omitted herein.

If the SCell checks whether the synchronization information of the UE and the synchronization information of the network are identical and whether the COUNT value reaches the predefined value, blocks following block 606 are the same as blocks 506, 507, 508, 509, 510, 511, 512 and 513 respectively and are omitted herein.

And thus, the process described in the third example ends.

Figure 7:
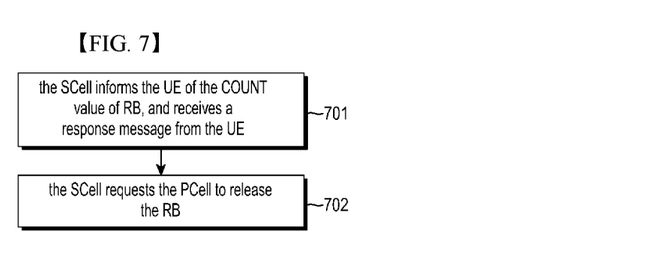
FIG. 7 is a flowchart illustrating a second method of the present application.

FIG. 7 describes a method for directly synchronizing the COUNT value between the SCell and the UE, i.e., a second method provided by the present application. The SCell checks whether the COUNT value overflows. When the COUNT value meets a predefined overflowing condition, the SCell informs the PCell of an overflow state, and the PCell may release the RB or reconfigure the RB to prevent from repeatedly use ofing the COUNT value of the RB. As shown in FIG. 7, the method includes: following blocks.

In block 701, the SCell informs the UE of the COUNT value of RB, and receives a response message from the UE.

In block 702, the SCell requests the PCell to release the RB.

The fourth example describes a process of synchronizing the COUNT value between the SCell and the UE. The method shown in FIG. 8 includes following blocks.

Figure 8:
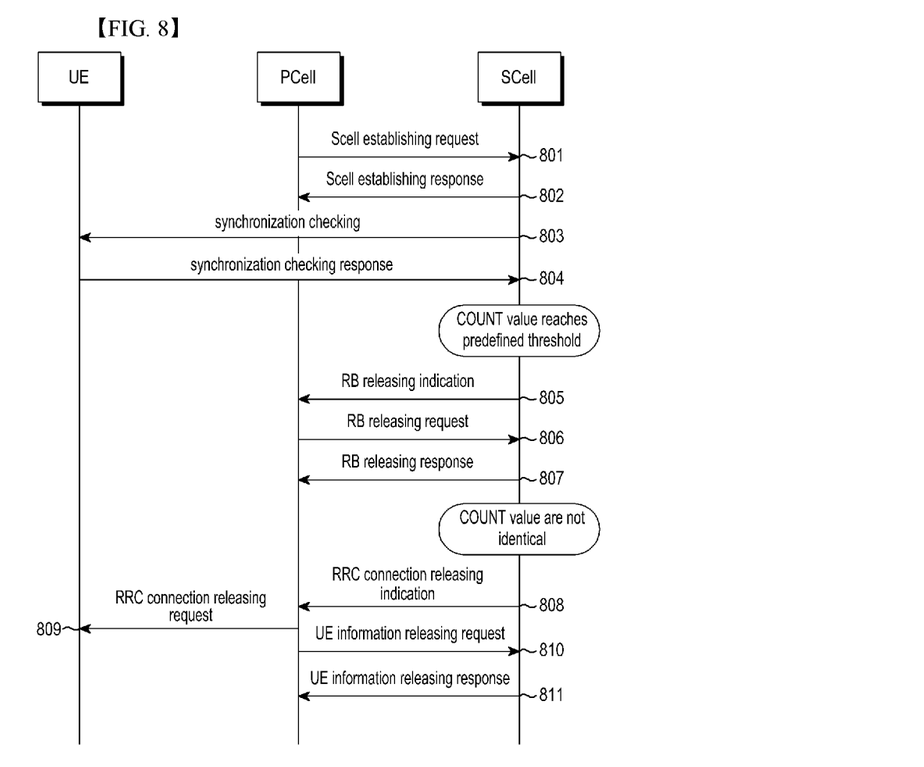
FIG. 8 is a flowchart illustrating a method according to a fourth example of the present application.

In block 801, the PCell transmits a SCell establishing request message to the SCell, and requests the eNB covering the SCell to establish a new RB for the UE. This block is the same as block 401 and is not illustrated herein.

In block 802, the SCell transmits a SCell establishing response message to the PCell. This block is the same as block 402 and is not illustrated herein.

In block 803, the SCell transmits a synchronization checking message to the UE.

The synchronization checking message contains the Bearer Id of the RB and the uplink COUNT value and/or downlink COUNT value of RB. Only several highest bits of the COUNT value may be contained when the COUNT value is transmitted. For example, highest 25 bits of the COUNT value are contained.

In block 804, the UE transmits a synchronization checking response message to the SCell.

The UE also saves the COUNT value of RB, checks whether the saved COUNT value and the COUNT value described in block 803 are identical, and transmits a checking result through a response message.

The response message may be implemented through different methods.

For example, the response message contains the Bearer Id of the RB, and the uplink COUNT value and/or downlink COUNT value of RB. Only several highest bits of the COUNT value may be contained. For example, highest 25 bits of the COUNT value are contained.

Or, when the COUNT value saved by the UE and the COUNT value described in block 803 are identical, the response message does not contain the information of the RB. If the COUNT value saved by the UE and the COUNT value described in block 803 are not identical, the response message contains the information of the RB. Cases that the COUNT value saved by the UE and the COUNT value described in block 803 are not identical include that:

(1) the RB has been established, but the RB is not contained in the synchronization checking message in block 803;

(2) the RB has been established and the RB is contained in the synchronization checking message in block 803, but the uplink and/or downlink COUNT value of the RB saved by the UE is not identical to the COUNT value indicated by the synchronization checking message in block 803;

(3) other instances.

In block 805, the SCell checks whether the COUNT value reaches the predefined threshold; if yes, the SCell determines that the COUNT value is close to an overflow state, and transmits a RB releasing request message. The RB releasing request message contains a Bearer Id, and may further contain a releasing reason.

In block 806, the PCell transmits a RB releasing request message to the SCell. The RB releasing request message contains a Bearer Id, and may further contain a releasing reason.

Block 806 may be replaced with another process, for example, the PCell transmits a SCell reconfiguring request message.

In block 807, the SCell performs corresponding configuration according to the message in block 806, and transmits a response message to the PCell.

In block 808, the SCell checks whether the synchronization information of the UE and the synchronization information of the network are identical, if the COUNT value on the UE and the COUNT value on the SCell are not identical, the SCell transmits a radio connection releasing indication message. The name of the radio connection releasing indication message may be another name. The radio connection releasing indication message contains the identity of the UE, and may further contain a releasing reason. The identity of the UE may be an X2 interface identity of the UE, or a unique identity of the UE, or any identity that can uniquely identify the UE in the SCell.

Blocks 809 to 811 are the same as blocks 408 to 410 respectively and are omitted herein.

And thus, the process described in the fourth example ends.

As can be seen from the above solution of the present application, by the methods for synchronizing the COUNT value between the SCell and the UE, the UE may decrypt the data transmitted by the SCell, and the SCell may also correctly decrypt the data transmitted by the UE, thereby ensuring the security and correctness of data. By the methods of the present application, the data of SCell is transmitted after being encrypted, thereby ensuring the security and correctness of data.

The foregoing is only preferred examples of the present application and is not used to limit the protection scope of the present application. Any modification, equivalent substitution and improvement without departing from the spirit and principle of the present application are within the protection scope of the present application.

What is claimed is:

1. A method by a first base station in a wireless communication system, the method comprising:
    receiving, from a second base station, a first message including a first count value associated with a radio bearer established for a terminal;
    transmitting, to the terminal, a second message including the first count value received from the second base station;
    receiving, from the terminal, a response message in response to the second message, the response message including a second count value associated with the radio bearer; and
    performing further action based on the first count value and the second count value.

2. The method of claim 1, wherein the further action comprises:
    transmitting, to the terminal, a third message for releasing a radio connection between the terminal and the second base station.

3. The method of claim 1, wherein the further action comprises:
    transmitting, to the second base station, a fourth message to release a resource of the terminal.

4. The method of claim 1, wherein the second count value is not identical to the first count value included in the second message.

5. The method of claim 1, further comprising:
    determining whether the first count value reaches a predefined threshold; and
    transmitting, to the second base station, a fifth message to request to release the first count value, reconfigure the first count value or perform another operation, if the first count value reaches the predefined threshold.

6. The method of claim 2, further comprising:
    determining whether the first count value and the second count value are identical; and
    releasing the radio connection and transmitting a sixth message, to the second base station, to request the second base station for releasing information of the terminal saved by the second base station, if the first count value and the second count value are not identical.

7. The method of claim 1, further comprising:
    transmitting, to the second base station, the second count value received from the terminal.

8. The method of claim 6, further comprising:
    requesting to release a radio resource control connection of the terminal, if the first count value and the second count value are not identical.

9. The method of claim 5, further comprising:
    receiving, from the second base station, a seventh message to request to release the first count value, reconfigure the first count value, or perform another operation, if the first count value reaches the predefined threshold.

10. The method of claim 1, wherein the first message is periodically transmitted by the second base station or the first message is transmitted by the second base station according to a configured threshold.

11. The method of claim 1, wherein the first base station receives the first count value from the second base station after transmitting, to the second base station, a eighth message of the first count value.

12. The method of claim 11,
    wherein the eighth message of the first count value comprises a cell identity of the second base station, and
    wherein the method further comprises:
        receiving, from the second base station, count values of all radio bearers established by the second base station for the terminal, if the eighth message of the first count value does not comprise an identity of the radio bearer established for the terminal.

13. An apparatus of a first base station for in a wireless communication system, the apparatus comprising:
    a transceiver; and
    a controller coupled with the transceiver and configured to control to:
        receive, from a second base station, a first message including a first count value associated with a radio bearer established for a terminal,
        transmit, to the terminal, a second message including the first count value received from the second base station,
        receive, from the terminal, a response message in response to the second message, the response message including a second count value associated with the radio bearer, and
        perform further action based on the first count value and the second count value.

14. The apparatus of claim 13, wherein the further action comprises:
    transmit, to the terminal, a third message for releasing a radio connection between the terminal and the second base station.

15. The apparatus of claim 13, wherein the further action comprises:
    transmit, to the second base station, a fourth message to release a resource of the terminal.

16. The apparatus of claim 13, wherein the second count value is not identical to the first count value included in the second message.

17. The apparatus of claim 13, wherein the controller is further configured to:
    determine whether the first count value reaches a predefined threshold, and
    transmit, to the second base station, a fifth message to request to release the first count value, reconfigure the first count value, or perform another operation, if the first count value reaches the predefined threshold.

18. The apparatus of claim 14, wherein the controller is further configured to:
    determine whether the first count value and the second count value are identical, and release the radio connection and transmit a sixth message, to the second base station, to request the second base station for releasing information of the terminal saved by the second base station, if the first count value and the second count value are not identical.

19. The apparatus of claim 13, wherein the controller is further configured to:
    transmit, to the second base station, the second count value.

20. The apparatus of claim 18, wherein the controller is further configured to:
    request to release a radio resource control connection of the terminal if the first count value and the second count value are not identical.

21. The apparatus of claim 17, wherein the controller is further configured to:
    receive, from the second base station, a seventh message to request to release the first count value, reconfigure the first count value, or perform another operation, if the first count value reaches the predefined threshold.

22. The apparatus of claim 13, wherein the first message is periodically transmitted by the second base station or the first message is transmitted by the second base station based on a configured threshold.

23. The apparatus of claim 13, wherein the controller is further configured to:
    receive the first count value from the second base station after transmitting, to the second base station, a eighth message of the first count value.

24. The apparatus of claim 23,
    wherein the eighth message of the first count value comprises a cell identity of the second base station, and
    wherein, if the eighth message of the first count value does not comprise an identity of the radio bearer established for the terminal, the controller is further configured to:
        receive, from the second base station, count values of all radio bearers established by the second base station for the terminal.

* * * * *